United States Patent [19]

Roberts et al.

[11] Patent Number: 4,963,403
[45] Date of Patent: Oct. 16, 1990

[54] UNITARY COMPOSITE MOLDING STRIP

[75] Inventors: Edward Roberts, Mt. Clemens, Mich.; James H. Greatorex, Wellsbourne, England; Douglas W. Spittal, Canlachie, Canada

[73] Assignee: Color Custom, Inc., Warren, Mich.

[21] Appl. No.: 114,500

[22] Filed: Oct. 30, 1987

[51] Int. Cl.⁵ .............................................. B60R 13/04
[52] U.S. Cl. ........................................ 428/31; 52/716; 156/244.11; 264/177.2; 293/128
[58] Field of Search ............... 49/490, 491; 52/208, 52/716; 428/31; 156/244.11; 264/177.1, 177.2; 293/128

[56] References Cited

U.S. PATENT DOCUMENTS

| | | | |
|---|---|---|---|
| 2,823,421 | 2/1958 | Scarlett | 428/480 X |
| 3,086,216 | 4/1963 | Brooks et al. | 428/31 X |
| 3,440,129 | 4/1969 | Anselm | 428/31 X |
| 3,547,516 | 12/1970 | Shanok et al. | 52/716 X |
| 4,087,223 | 5/1978 | Angioletti et al. | 264/275 X |
| 4,269,897 | 5/1981 | Gans et al. | 428/31 X |
| 4,381,273 | 4/1983 | Azzola | 428/188 X |
| 4,470,943 | 9/1984 | Preis | 264/162 |
| 4,563,141 | 1/1986 | Zoller | 428/31 X |
| 4,581,807 | 4/1986 | Adell | 428/122 X |
| 4,643,659 | 2/1987 | Paul | 264/171 X |
| 4,656,807 | 4/1987 | Anhegger et al. | 428/31 X |
| 4,708,895 | 11/1987 | Mizusawa | 428/31 |

*Primary Examiner*—Henry F. Epstein
*Attorney, Agent, or Firm*—Brooks & Kushman

[57] ABSTRACT

Extrusion method and apparatus and part produced by the method and apparatus, such as a molding strip which includes a decorative Mylar plastic strip located between a pair of interbonded plastic layers. The top plastic layer or top coat is clear so that the decorative strip can be seen therethrough. A single die is utilized to produce the molding strip. The plastic layers are both preferably flexible PVC plastic which are interbonded by interfusion between adjacent surfaces while in a molten state within a bonding chamber of the die so that the plastic layers do not separate during use of the molding strip. The top coat is interbonded with the other plastic layer or body without requiring the clear plastic to totally encapsulate the resulting molding strip. Also, preferably, a reenforcement wire is embedded in the plastic body within the bonding chamber to give the molding strip additional strength.

8 Claims, 2 Drawing Sheets

UNITARY COMPOSITE MOLDING STRIP

TECHNICAL FIELD

This invention relates to an extrusion method and apparatus and part produced thereby and, in particular, to an extrusion method and apparatus for producing a molding strip which includes a decorative plastic strip located between a pair of interbonded plastic layers.

BACKGROUND ART

Plastic molding strips are provided for various goods such as appliances and motor vehicles in order to interconnect other parts and to minimize damage to the article to which it is connected through inadvertent, slight contact. In order to enhance the appearance of such molding strips, such molding strips have included a decorative plastic strip such as a Mylar polyester film having a vacuum metallized layer formed thereon. In order to protect the polyester film yet still allow the polyester film to be seen with its metallized layer, the polyester film is oftentimes covered by a clear plastic layer, such as clear polyvinyl chloride (i.e. PVC).

Frequently, the clear PVC totally encapsulates the molding strip in order to prevent separation between the underlying plastic body and the clear PVC. However, total encapsulation by the clear PVC is undesirable for a number of reasons including inefficient use of the clear PVC.

One proposed alternative to total encapsulation by the clear PVC of the molding strip is to use multiple dies, the last one of which applies a top coat of clear PVC to the extruded plastic body after the decorative plastic strip has been placed on the plastic body.

Another reason to use multiple dies is that the decorative plastic strip would commonly break under the high temperature and pressure conditions existing in the die forming the plastic body.

One disadvantage of this method is that the clear plastic layer has a tendency to separate from its underlying plastic body during use of the molding strip, especially when the molding strip encounters impact at extreme temperatures or when the molding strip is used around corners having a relatively small radius. Also, the decorative plastic strip has a tendency to wrinkle or buckle during use of the molding strip to thereby detract from the appearance of the molding strip. Consequently, many manufacturers have decided to provide molding strips without such a decorative plastic strip.

The U.S. Pat. Nos. to Angioletti et al 4,087,223, Gans et al 4,269,897, Azzola 4,381,273, Preis 4,470,943, Zoller 4,563,141, Adell 4,581,807 and Paul 4,643,659 all deal with extrusion of more than one type of plastic to form a resulting plastic part. For example, the U.S. Patent to Azzola discloses a sealing strip, including a channel-shaped attachment profile of rubber in which a metallic reenforcing strip is embedded. The profile has an external coating layer of sponge rubber with an outer surface rendered velvety by abrasion.

The U.S. Patent to Gans et al discloses a process for extruding resilient, impact-resistant, thermoplastic strips having a metallic appearance by providing a non-metallic film strip of material and having a vapor-deposited, metallized surface. The film strip has melting and deformation temperatures higher than those of the transparent thermoplastic extruded thereon and resiliency and an elasticity at least as high as the resiliency and elasticity of the transparent thermoplastic when extruded thereon. While feeding the film strip through a crosshead die, the thermoplastic material is extruded about the metallized film strip and the resilient impact-resistant thermoplastic strip has a metallic appearance produced thereby.

DISCLOSURE OF THE INVENTION

An object of the present invention is to provide an improved method and apparatus for continuous composite molding of a molding strip which includes a decorative plastic strip located between a pair of interbonded plastic layers wherein a single die is utilized to produce the molding strip without breaking the decorative plastic strip.

Another object of the present invention is to provide an improved method and apparatus for continuous composite molding of a molding strip having a decorative plastic strip interposed between a pair of interbonded plastic layers wherein the molding is performed in such a fashion so that the plastic layers do not separate during use of the molding strip.

Yet still another object of the present invention is to provide an improved method and apparatus for continuous composite molding of a molding strip including a decorative plastic strip interposed between a first clear plastic layer and a second plastic layer wherein the molding strip is produced in a relatively cost-efficient fashion (i.e. it is not necessary to totally encapsulate the resulting molding strip in the first plastic).

In carrying out the above objects and other objects of the present invention, a method for continuously forming a composite molding strip is provided. The method utilizes a single extrusion die which includes first, second and third passages communicating with the outer surface of the die with a common bonding chamber formed in the die. The method comprises the steps of extruding a molten first plastic through the first passage and to a bottom portion of the bonding chamber, feeding a thin, narrow plastic strip, having a decorative layer formed thereon through the second passage and into a top portion of the bonding chamber and extruding a molten, clear second plastic through the third passage and into the top portion of the bonding chamber. The plastic strip is disposed between the bottom surface of the second plastic and a top surface of the first plastic. The second plastic is interbonded with the first plastic by interfusion between the surfaces while in the molten state to form the molding strip with the plastic strip disposed therebetween so that the decorative layer can be seen through the clear second plastic.

Further in carrying out the above objects and other objects of the present invention, an extrusion die for use in forming a continuous composite molding strip along a forming axis is provided. The molding strip has a body of a first plastic, a clear top coat of a second plastic and a plastic strip interposed between the plastic body and the plastic top coat. The die includes a bonding chamber therewithin the die, a first passage extending from the outer surface of the die and into the bottom portion of the bonding chamber to receive the first plastic in molten form and a second passage communicating the outer surface of the die with the bonding chamber to receive the plastic strip. A third passage extends from the outer surface of the die into a top portion of the bonding chamber to receive the clear second plastic. A snout having an aperture communicating the second passage with the bonding chamber and extending a direction parallel to the forming axis permits the passage of the plastic strip therethrough into the bonding chamber between a bonding surface of the clear second plastic and a top surface of the first plastic. An upper portion of the snout directs the flow of the clear molten plastic from the third passage into the bonding chamber in a direction parallel to the forming axis. A bottom portion of the snout at least partially defines an opening extending along the forming axis and communicating the first passage with the bonding chamber. The first plastic and the clear plastic are interbonded by interfusion between the surfaces within the bonding chamber with the plastic strip disposed therebetween to form the molding strip.

Still further in carrying out the above objects and other objects of the present invention, a continuous composite molding strip is provided. The molding strip includes a body of plastic having a top surface, a thin, narrow, plastic strip having a decorative layer formed thereon and overlying the top surface of the plastic body, and a top coat of clear plastic having a bottom surface overlying the decorative layer of the plastic strip. The plastic top coat is interbonded with the plastic body by interfusion between the surfaces while in a molten state to form the molding strip with the plastic strip therebetween so that the decorative layer can be seen through the clear plastic top coat.

Preferably, a fourth passage communicates the outer surface of the die with the common bonding chamber to allow the feeding of a reenforcing wire through the fourth passage and into the lower portion of the bonding chamber while the first plastic is in the molten state to provide added strength to the molding strip.

Also, preferably, the plastic strip includes a polyester film having a vacuum metallized layer. The top coat and the body of the molding strip are formed from resilient PVC.

The above extrusion method and apparatus and molding strip provide numerous advantages. For example, the molding strip is produced with a single die. Also, the plastic layers of the molding strip do not separate during use of the molding strip. The decorative plastic strip does not buckle or wrinkle during use of the molding strip. Furthermore, the molding strip can be produced in a relatively cost-efficient fashion without wasting plastic material.

Other advantages of the present invention can be readily appreciated as the same becomes better understood by reference to the following detailed description when considered in connection with the accompanying drawings.

BEST MODE FOR CARRYING OUT THE INVENTION

Figure 1:
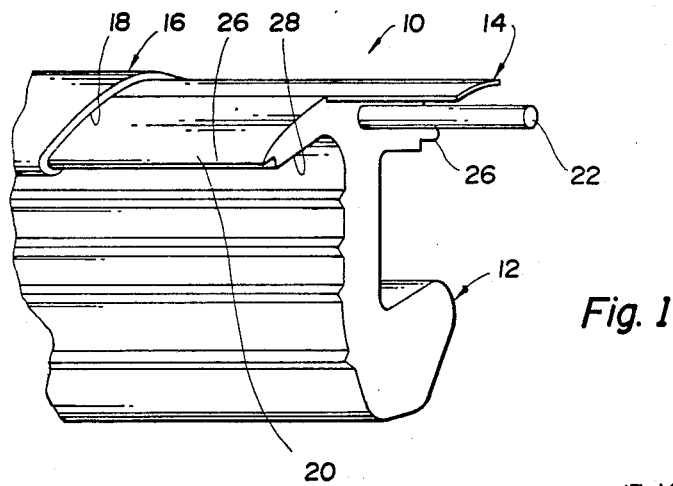
FIG. 1 is a perspective broken away view of a molding strip constructed in accordance with the method and apparatus of the present invention.
Figure 2:
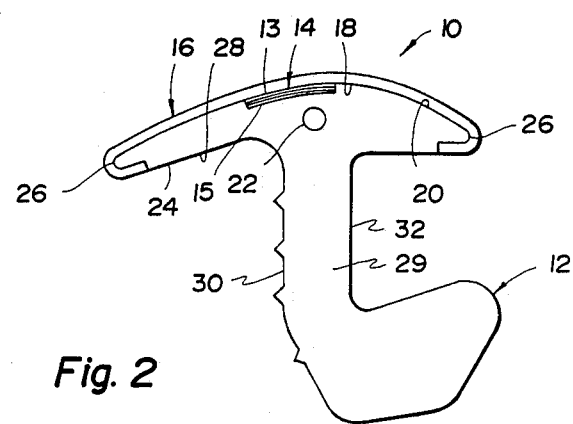
FIG. 2 is an end view of the molding strip of FIG. 1.
Figure 3:
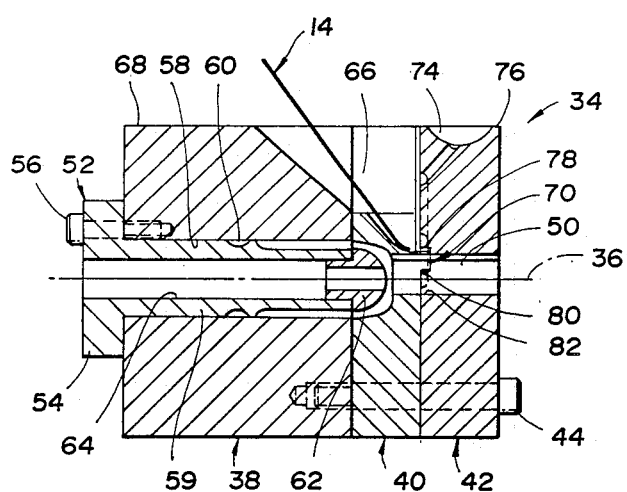
FIG. 3 is a side sectional view of a die constructed in accordance with the present invention and utilized in accordance with the method of the present invention.

Referring now to the drawing figures, there is illustrated in FIGS. 1 and 2 a continuous composite molding strip, generally indicated at 10, constructed in accordance with the present invention. The molding strip 10 may be utilized as a vehicle body side molding to interconnect a vehicle body panel and a windshield, for example. However, it is to be understood that the molding strip 10 can also be used on other products and goods, such as appliances and the like.

The molding strip 10 includes a body, generally indicated at 12, preferably of a black plastic, such as black PVC, BOCMS 2-8 Type VI grade EU30L. However, it is to be understood that a different flexible plastic, such as polyurethane, can also be utilized with the present invention.

The molding strip 10 also includes a thin, narrow decorative plastic strip, generally indicated at 14, having a metallized layer formed thereon. Preferably, the plastic strip 14 includes a Mylar polyester film having the metallized layer 13 formed thereon. The plastic strip 4 also includes a rigid PVC layer 15. Mylar is a registered trademark of the DuPont Company and the polyester film is described in U.S. Pat. No. 2,823,421.

The molding strip 10 also preferably includes a top coat, generally indicated at 16, of the same material as the body 12 except that the PVC is clear PVC or other plastic such as polyurethane (and has the grade EUC). The plastic top coat 16 is interbonded to the plastic body 12 by interfusion between a bottom surface 18 of the top coat 16 and a top surface 20 of the plastic body 12 while both plastics are in the molten state with the plastic strip 14 therebetween. As a result, the metallized layer 13 of the plastic strip 14 can be seen through the clear plastic top coat 16.

Bonding by interfusion between the surfaces 10 and 20, in effect, causes the two layers of plastic to act as a single piece of relient plastic and is thereby effective to absorb shocks to the top surface of the top coat 16 without damage to the molding strip 10.

The molding strip 10 also includes a reinforcing wire 22 which extends along the longitudinal length of the molding strip 10 and is embedded within the plastic body 12 to thereby strengthen the molding strip 10.

As illustrated in FIGS. 1 and 2, the plastic body 12 includes a cap-shaped, upper portion 24 having curved side surfaces 26 and a lower surface 28. The bottom surface 18 of the top coat 16 wraps around the side surfaces 26 and is further interbonded with the side and lower surfaces 26 and 28, respectively. Interfusion occurs between their respective surfaces while in the molten state to further strengthen the bond between the top coat 16 and the body 12.

The upper portion 24 of the plastic body 12 at least partially defines a pair of part receiving and retaining grooves 30 and 32 on opposite sides of a stem portion 29 of the plastic body 12. As illustrated in FIGS. 1 and 2, the groove 30 is adapted to receive and retain therein a body panel (not shown) while the groove 32 is adapted to receive and retain a piece of glass or plastic, such as a windshield or a backlight (also not shown).

Referring now to FIGS. 3 through 7, there is illustrated an extrusion die, generally indicated at 34 for forming the molding strip 10 along a forming axis 36. The extrusion die 34 includes a crosshead, generally indicated at 38 and first and second extrusion plates 40 and 42, all of which are held together by bolts 44. Bolts 39 are provided for securing the crossheads 38 and, consequently, the die 34 to the discharge end of the extruder (not shown) of the opaque molten plastic for the body 12.

Figure 4:
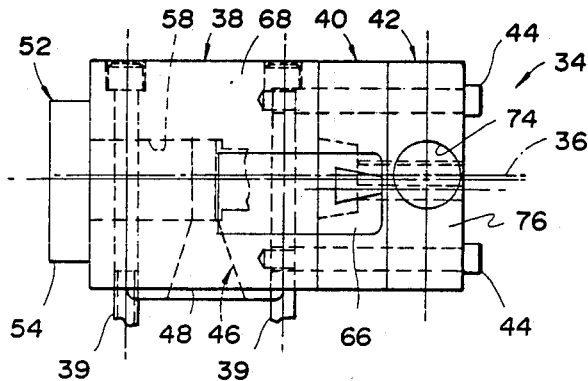
FIG. 4 is a top plan view of the die of FIG. 3 with various apertures indicated by phantom lines.
Figure 5:
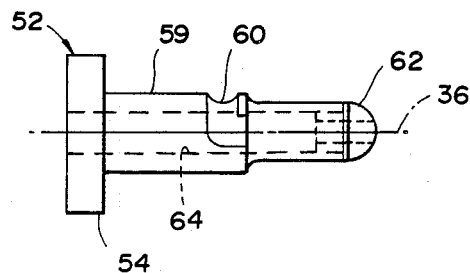
FIG. 5 is a side elevational view of a part of the die of FIGS. 3 and 4.
Figure 6:
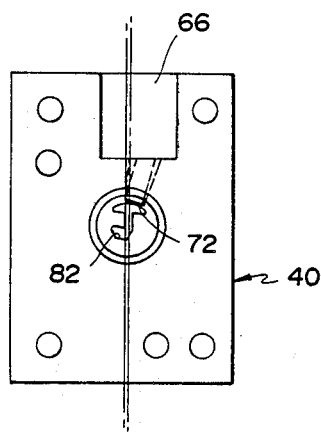
FIG. 6 is an inner end view of one of the plates of the die of FIGS. 3 and 4.
Figure 7:
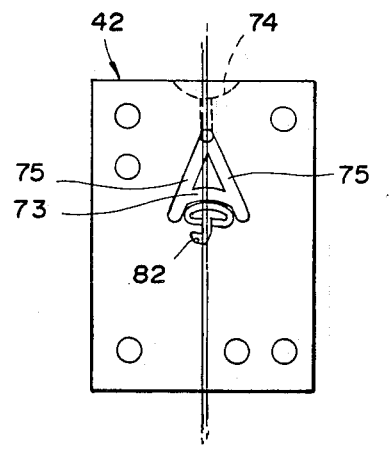
FIG. 7 is an inner end view of a second plate of the die of FIGS. 3 and 4.

The crosshead 38 includes a first passage, generally indicated at 46 in FIG. 4, which extends from the outer surface 48 of the crosshead 38 into a bottom portion of a bonding chamber 50 formed in the second plate 42. The passage 46 receives the black plastic in molten form.

The die 34 also includes a tube or snorkel, generally indicated at 52. A head portion 54 of the snorkel is secured by bolts 56 to the crosshead 38 to retain the snorkel 52 within a cylindrical opening 58 formed in the crosshead 38. The outer periphery of a cylindrical portion 59 of the snorkel 52 cooperates with the inner surface of the crosshead 38 to define a circular groove 60 for receiving and directing the molten black plastic from a direction transverse the forming axis 36 to a direction parallel with the forming axis 36.

The snorkel 52 also includes a hollow end cap member 62 which is fit within a passage 64 formed in the snorkel 52 along the forming axis 36 to further direct the molten black plastic along the first passage 46 and into the molding or bonding chamber 50.

The passage 64 extends through the snorkel 52 to receive and direct the wire 22 from the exterior of the die 34, through the hollow end cap member 62, and into the chamber 50.

Another passage 66 is cooperatively formed by the crosshead 38 and the first plate 40 to communicate a top outer surface 68 of the crosshead 38 with the bonding chamber 50 and to receive the decorative plastic strip 14. The first plate 40 includes a snout or snout portion, generally indicated at 70, which has an aperture 72 extending through and communicates the passage 66 with the bonding chamber 50. The aperture 72 extends in a direction parallel to the forming axis 36 to permit the passage of the plastic strip 14 therethrough and into the bonding chamber 50. The snout 70 prevents the plastic strip 14 from "wandering" to precisely position the strip 14 in the chamber 50.

Another passage 74 extends from a top surface 76 of the second plate 42 and into a top portion of the bonding chamber 50 to receive the clear plastic. The passage 74 includes side branches 75 and an interconnecting middle branch 73 which are defined by the opposing surfaces of the first and second plates 40 and 42, respectively. The branches 73 and 75 allow for the even distribution of clear molten plastic over the top and side surfaces of an upper portion 78 of the snout 70. The upper portion 78 of the snout 70 directs the flow of the clear molten plastic from its downwardly flowing direction in the passage 74 to a direction parallel to the forming axis 36 so that the clear molten plastic does not exert excessive downward pressure on the plastic strip 14 within the bonding chamber 50. In this way, the snout 70 protects the plastic strip 14 from breaking.

A bottom portion 80 of the snout 70 at least partially defines an opening 82 which extends along the forming axis 36 and communicates the first passage 46 with the bonding chamber 50.

Within the bonding chamber 50 the black molten plastic and the clear molten plastic are interbonded by interfusion between their contacting surfaces with the plastic strip 14 disposed therebetween to form the molding strip 10 of FIGS. 1 and 2.

The advantages accruing to the use of the present invention are numerous. For example, a single die is utilized to produce the molding strip 10 without breaking the decorative plastic strip 14. Also, the plastic body 12 and the plastic top coat 16 are interbonded in such a fashion such that the top coat 16 and the body 12 do not separate during use of the molding strip 10. Furthermore, it is not necessary to fully encapsulate the plastic body 12 with the plastic top coat to form a shock-absorbing molding strip. Plastic material is saved and the decorative plastic strip 14 is protected from wrinkling or buckling during use of the molding strip 10.

While the best mode for carrying out the invention has been described in detail, those familiar with the art to which this invention relates will recognize various alternative design and embodiments for practicing the invention as defined by the following claims.

What is claimed is:

1. A unitary composite molding strip comprising:
   a body of extruded plastic having a top surface and a stem extending from the opposite side of the top surface;
   a thin, narrow, plastic strip including a decorative layer and overlaying the top surface of the plastic body;
   at least a pair of part receiving and retaining grooves on the opposite sides of the stem; and
   a top coat of a clear plastic co-extruded with the body of extruded plastic and having a bottom surface overlaying the decorative layer of the plastic strip, the plastic top coat being interbonded with the plastic body by interfusion between the surfaces while in a molten state to form the molding strip with the plastic strip therebetween so that the decorative layer can be seen through the clear plastic top coat and to prevent the plastic body from separating from the top coat during use of the molding strip.

2. The molding strip as claimed in claim 1 wherein the plastic of the body is PVC.

3. The molding strip as claimed in claim 2 wherein the clear plastic is PVC.

4. The molding strip as claimed in any one of claims 2, 3 or 1, wherein the plastic strip includes a polyester layer.

5. The molding strip as claimed in claim 4 wherein the decorative layer is a metallized layer and wherein the plastic strip further includes a PVC layer.

6. The molding strip as claimed in claim 1 further comprising a reinforcing wire extending along the longitudinal length of the molding strip and embedded within the plastic body.

7. The molding strip as claimed in claim 1 wherein an upper portion of the body has curved side surfaces and a lower surface and wherein the bottom surface of the plastic top coat is interbonded with the side and lower surfaces of the upper portion of the plastic body by interfusion between the surfaces while in the molten state.

8. The molding strip as claimed in claim 7 wherein the upper portion of the plastic body at least partially defines the pair of part receiving and retaining grooves on opposite sides thereof.

* * * * *